United States Patent Office 3,476,790
Patented Nov. 4, 1969

3,476,790
2,4,5-NITRODIHALOBENZYL THIOCYANATES
John J. Barch, Crestwood, N.Y., assignor to Tenneco Chemicals, Inc., a corporation of Delaware
No Drawing. Filed Sept. 28, 1966, Ser. No. 582,489
Int. Cl. C07c 161/02; A01n 9/18
U.S. Cl. 260—454                                  3 Claims

ABSTRACT OF THE DISCLOSURE

Fungicidal compositions that are suitable for use on living plant materials intended for human or animal consumption contain a 2,4,5-nitrodihalobenzyl cyanide or thiocyanate as their fungicidally-active ingredient. Illustrative of these fungicidal compounds are 2,4-dichloro-5-nitrobenzyl thiocyanate and 2-nitro-4,5-dichlorobenzyl thiocyanate.

This invention relates to fungicidal compositions and to a method of controlling the growth of fungi. More particularly, it relates to fungicidal compositions that are suitable for use on living plant materials intended for human or animal consumption and to a method of controlling the growth of fungi on plant materials through the use of these compositions.

In accordance with the present invention, it has been found that 2,4,5-nitrodihalobenzyl cyanides and thiocyanates are highly effective in controlling the growth of a wide variety of fungi including plant pathogens, such as those responsible for late blight of tomatoes, leaf-spot of soybeans, leaf rust of wheat, damping off of sugar beets, powdery mildew of cucumbers, and other serious crop diseases. The fungicidal compounds are stable and resistant to weathering and at the concentration levels necessary to control fungi are substantially non-toxic to both the living plants and to mammals consuming the plant materials.

The compounds that can be used as the primary fungicidally-active component of the fungicidal compositions of this invention may be represented by the structural formula

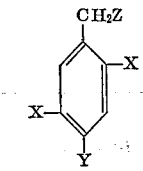

wherein one of the X substituents represents a halogen atom, that is, a chlorine, bromine, or iodine atom; the other X substituent represents a nitro group; Y represents a halogen atom; and Z represents either —CN or —SCN. Illustrative of these compounds are 2-nitro-4,5-dichlorobenzyl cyanide,
2-nitro-4,5-dibromobenzyl cyanide,
2-nitro-4-bromo-5-chlorobenzyl chloride,
2,4-dichloro-5-nitrobenzyl cyanide,
2,4-dibromo-5-nitrobenzyl cyanide,
2,4-diiodo-5-nitrobenzyl cyanide,
2-nitro-4,5-dichlorobenzyl thiocyanate,
2-nitro-4,5-dibromobenzyl thiocyanate,
2-nitro-4-chloro-5-iodobenzyl thiocyanate,
2,4-dichloro-5-nitrobenzyl thiocyanate,
2,4-dibromo-5-nitrobenzyl thiocyanate, and the like.

The preferred compounds for use as agricultural fungicides are the 2,4,5-nitrodichlorobenzyl cyanides and thiocyanates. A single nitrodihalo compound or a mixture of two or more of these compounds may be present in the fungicidal compositions of this invention.

The novel fungicidal compounds may be prepared by any suitable and convenient procedure. For example, a dihalobenzyl chloride may be reacted with an alkali metal cyanide or thiocyanate to form the corresponding dihalobenzyl cyanide or thiocyanate which may then be nitrated using nitric acid to form the desired nitrodihalobenzyl cyanide or thiocyanate. Alternatively, the appropriate nitrodihalobenzyl chloride may be reacted with an alkali metal cyanide or thiocyanate to form the fungicidal compound.

Various techniques may be used for treating crop plants with the fungicidal compositions of this invention. For example, the parts of the plant above or in the soil or the plant seeds may be contacted with the fungicidal composition. Alternatively, the fungicide may be introduced into the soil near the roots of the plants. The fungicidal compound may also be introduced directly into the plant, for example, through holes or incisions in its stem or leaves.

While the nitrodichlorobenzyl cyanides and thiocyanates may be applied as such to plants, to seeds, or to the soil, they are ordinarily and preferably combined with an inert fungicidal adjuvant carrier and applied as sprays or as dusts.

The fungicidal compounds are preferably applied by spraying the plants, seeds, or soil with an aqueous emulsion or suspension of the nitrodihalobenzyl cyanide or thiocyanate. Aqueous emulsions or suspensions containing about 0.001 percent to 1 percent by weight, and preferably 0.01 percent to 0.5 percent by weight, of the active agent are particularly suitable for this use. These sprays generally also contain about 0.01 percent to about 0.05 percent by weight of a conventional wetting agent, such as an alkyl sulfate salt, an alkyl aryl sulfonate salt, a sulfosuccinate salt, a polyethylene glycol ether, and the like.

The fungicidal compounds may also be dissolved in inert organic solvents, such as acetone, naphtha, or ethylene dichloride, and applied as solutions, or they may be mixed with or deposited upon such inert finely-divided solid carriers as tricalcium phosphate, chalk, bentonite, kaolin, talc, and the like, and applied as dusts.

The nitrodihalobenzyl cyanides and thiocyanates may be used as the sole active component of the fungicidal compositions. If desired, however, these compositions may also contain other fungicides such as sulfur, the metal dimethyldithiocarbamates, and the metal ethylene bis (dithiocarbamates); insecticides such as chlordane, benzene hexachloride, and DDT; or plant nutrients such as urea, ammonium nitrate, and potash.

The invention is further illustrated by the examples that follow.

Example 1

To 200 cc. of methanol was added 98 grams (0.5 mole) of 3,4-dichlorobenzyl chloride and then 37 grams (0.75 mole) of sodium cyanide. The reaction mixture was stirred and heated at its reflux temperature for 5.5 hours, cooled to 20° C., and filtered. The filtrate was poured into 500 cc. of ice water. The reaction mixture was allowed to stand and then filtered to remove the yellow precipitate that had formed. This product was washed with water and air-dried. There was obtained 90 grams of 3,4-dichlorobenzyl cyanide, which contained 38.0% Cl and 7.28% N (calculated for $C_8H_5NCl_2$, 38.1% Cl and 7.5% N).

The 3,4-dichlorobenzyl cyanide was added to 270 grams of 90% nitric acid over a 20-minute period at such a rate that the temperature of the reaction mixture did not exceed 35° C. Then the reaction mixture was stirred for four hours at 30°–35° C., poured into 2 liters of ice water, and the resulting mixture filtered. The solid product was dissolved in 200 cc. of chloroform. This solution was washed with water and then heated under reduced pressure to remove the chloroform. There was obtained 92 grams of an oil which crystallized on standing. The crystalline product, which melted at 76°–80° C., contained 31.9% Cl and 11.0% N (calculated for $C_8H_4N_2O_2Cl_2$ 30.6% Cl and 12.1% N). Infrared analysis confirmed that the product is 2-nitro-4,5-dichlorobenzyl cyanide.

Example 2

Using the procedure described in Example 1 3,4-dichlorobenzyl chloride was reacted with a 50% stoichiometric excess of potassium thiocyanate in methanol to form 3,4-dichlorobenzyl thiocyanate. This compound was then nitrated with 90% nitric acid to give a 90% yield of 2-nitro-4,5-dichlorobenzyl thiocyanate, which contained 28.4% Cl, 9.2% N, and 11.9% S (calculated for $C_8H_4N_2SO_2Cl_2$ 27.0% Cl, 10.6% N, and 12.1% S). Infrared analysis confirmed the structure of the product.

Example 3

To 100 cc. of acetone was added 80.2 grams (0.3 mole) of 2,4-dichloro-5-nitrobenzyl chloride and 43.6 grams (0.45 mole) of potassium thiocyanate. This mixture was stirred and heated at its reflux temperature for 4.5 hours, cooled to 20° C., and filtered. The filtrate was poured into 500 cc. of ice water and the resulting mixture filtered. The solid product was washed with water, air-dried overnight, and then dried under vacuum at 40° C. for 3 hours. There was obtained 80.1 grams of 2,4-dichloro-5-nitrobenzyl thiocyanate which melted at 77°–80° C. and which contained 29.2% Cl, 8.9% N, and 11.2% S. Its structure was confirmed by infrared analysis.

Example 4

Using the procedure described in Example 3 2,4-dichloro-5-nitrobenzyl chloride was reacted with a 50% stoichiometric excess of sodium cyanide in acetone to form 2,4-dichloro-5-nitrobenzyl cyanide. After washing and drying, there was obtained an 88% yield of 2,4-dichloro-5-nitrobenzyl cyanide which melted at 80°–82° C. and which contained 32.0% Cl and 11.7% N. Its structure was confirmed by infrared analysis.

Example 5

Acetone solutions were prepared by dissolving 100 mg. portions of the products of Examples 1–4 in 10 ml. of acetone that contained 2000 p.p.m. of sorbitan trioleate (Span 85) and 5000 p.p.m. of a polyoxyethylene ether of sorbitan monooleate (Tween 80). The acetone solutions were then dispersed in 90 ml. portions of distilled water to form aqueous solutions that contained 1000 p.p.m. of the fungicidal compound. More dilute solutions were obtained by adding distilled water to these solutions.

Example 6

Cheyenne wheat plants that were 6–8 inches tall were sprayed until the liquid dripped from the plants with an aqueous solution of 2-nitro-4,5-dichlorobenzyl thiocyanate which had been prepared by the procedure of Example 5. When the plants had dried, they were sprayed with a suspension of spores of wheat leaf rust disease *Puccinia rubigo-vera.* Ten days after treatment, it was found that the degree of suppression of the disease was 78 percent with the wheat plants uninjured by the treatment.

Example 7

Tomato plants that were 6–8 inches tall were sprayed with aqueous solutions prepared by the procedure of Example 5 until the liquid dripped from the leaves. When the plants had dried, they were sprayed with a suspension of spores of the tomato late blight fungus *Phytophthora infestans.* One week after treatment, the degree of suppression of the disease was noted. The following results were obtained:

| Fungicide | Concentration of Fungicide in Aqueous Solution, p.p.m. | Percent Control of Late Blight of Tomato | Phytotoxicity |
|---|---|---|---|
| 2-nitro-4,5-dichlorobenzyl cyanide | 1,000 | 97 | None. |
|  | 500 | 72 | Do. |
|  | 250 | 60 | Do. |
| 2,4-dichloro-5-nitrobenzyl cyanide | 1,000 | 94 | Do. |
|  | 500 | 64 | Do. |
| 2-nitro-4,5-dichlorobenzyl thiocyanate | 1,000 | 100 | Do. |
|  | 500 | 99 | Do. |
|  | 250 | 99 | Do. |
|  | 125 | 72 | Do. |
|  | 63 | 41 | Do. |
| 2,4-dichloro-5-nitrobenzyl thiocyanate | 1,000 | 100 | Do. |
|  | 500 | 100 | Do. |
|  | 250 | 99 | Do. |
|  | 125 | 98 | Do. |
|  | 63 | 83 | Do. |

Example 8

Cucumber plants that were 6–8 inches tall were sprayed until the liquid dripped from the plants with an aqueous solution that contained 1000 p.p.m. of 2,4-dichloro-5-nitrobenzyl thiocyanate. When the plants had dried, they were sprayed with a suspension of spores of powdery mildew disease *Erysiphe cichoracearum.* Ten days after treatment, it was found that the degree of suppression of the disease was 85 percent, with the cucumber plants uninjured by the treatment.

In addition to being useful in the control of plant pathogens, the compounds of this invention are useful as industrial biocides inasmuch as they have been shown to have excellent activity against such fungi as *A. niger, P. crustesum,* and *P. pullulans* and such bacteria as *B. subtilis.*

The terms and expressions which have been employed herein are used as terms of description and not of limitation. There is no intention in the use of these terms and expressions of excluding any equivalents of the features shown and described or portions thereof.

What is claimed is:

1. A compound having the structural formula

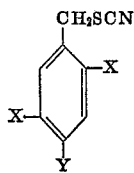

wherein one of the X substituents represents chlorine, bromine, or iodine; the other X substituent represents nitro; and Y represents chlorine, bromine, or iodine.

2. The compound as set forth in claim 1 that has the structural formula

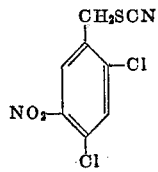

3. The compound as set forth in claim 1 that has the structural formula

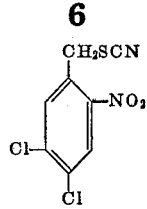

References Cited

UNITED STATES PATENTS 3,109,015  10/1963  Rosen _____ 260—454
3,154,518  10/1964  Gradsten et al. __ 260—454 XR

FOREIGN PATENTS 825,693  12/1959  Great Britain.

CHARLES B. PARKER, Primary Examiner
DOLPH H. TORRENCE, Assistant Examiner

U.S. Cl. X.R.

260—646, 651, 465; 424—302, 304